(12) United States Patent
Kendall et al.

(10) Patent No.: US 11,565,483 B2
(45) Date of Patent: Jan. 31, 2023

(54) CONTOUR FORMING IN FIBER-PLACEMENT SYSTEM

(71) Applicant: The Boeing Company, Chicago, IL (US)

(72) Inventors: James R. Kendall, Mt. Pleasant, SC (US); Stephen J. Dostert, Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/466,258

(22) Filed: Sep. 3, 2021

(65) Prior Publication Data

US 2022/0212422 A1 Jul. 7, 2022

Related U.S. Application Data

(60) Provisional application No. 63/133,552, filed on Jan. 4, 2021.

(51) Int. Cl.
*B32B 41/00* (2006.01)
*B29C 70/38* (2006.01)
*B29C 70/54* (2006.01)
*B29L 31/30* (2006.01)

(52) U.S. Cl.
CPC ............ *B29C 70/382* (2013.01); *B29C 70/54* (2013.01); *B29L 2031/3076* (2013.01)

(58) Field of Classification Search
CPC ..... B29C 70/382; B29C 70/54; B29C 70/342; B29C 70/38; B29L 2031/3076
USPC .................... 156/60, 64, 350, 351, 378, 379
See application file for complete search history.

(56) References Cited

U.S. PATENT DOCUMENTS

| 8,918,970 B2 | 12/2014 | Hayse |
| 10,016,932 B2 | 7/2018 | Moore et al. |
| 2006/0048881 A1 | 3/2006 | Evans et al. |
| 2016/0257427 A1 | 9/2016 | Humfeld et al. |
| 2016/0298267 A1* | 10/2016 | Feeney ................... B29B 11/16 |
| 2020/0061940 A1 | 2/2020 | Feng |

FOREIGN PATENT DOCUMENTS

EP 1757434 A2 2/2007

* cited by examiner

*Primary Examiner* — Michael N Orlando
*Assistant Examiner* — Joshel Rivera
(74) *Attorney, Agent, or Firm* — Quinn IP Law (57) ABSTRACT

A method for contour forming in a fiber placement system. The method includes painting multiple sliced layers on a stationary form to create a composite component. The sliced layers include multiple hoop tows. One or more overlap splices are formed in each of the hoop tows. The method includes applying a layup heat to multiple target areas on the sliced layers during the painting. The target areas are spatially arranged to permit a slippage in the splices. The method further includes draping the composite component on a curved tool with the hoop tows oriented perpendicular to an axis of curvature of the curved tool, and applying a curing heat to the composite component after the composite component has been contoured by the curved tool. The curing heat inhibits a further slippage in the overlap splices.

20 Claims, 10 Drawing Sheets

Fig-13

CONTOUR FORMING IN FIBER-PLACEMENT SYSTEM

CROSS-REFERENCE TO RELATED APPLICATION

The present application claims priority to, and the benefit of, U.S. Provisional Patent Application No. 63/133,552 filed on Jan. 4, 2021, the entire disclosure of which is incorporated by reference herein.

TECHNICAL FIELD

The disclosure relates generally to composite component manufacturing, and in particular, to contour forming in a fiber-placement system.

BACKGROUND

Off-line fiber placement techniques allow a composite skin to be formed independent of a vehicle on which the composite skin is subsequently applied. After forming, the composite skin is picked up, placed in position, and secured to the vehicle. Issues with the off-line fiber placement techniques include a criterion for an off-line layup surface used to form the composite skin to have a similar contour to the final skin, and there is a risk of wrinkles. Layup on contoured tools adds cost to layup machinery, adds costs to tooling, and increases a foot print used in manufacturing. Alternatively, a hot drape form can be used that adds verification complexity and has thickness limitations without incurring significant heating time.

SUMMARY

A method for contour forming in a fiber placement system is provided herein. The method includes painting a plurality of sliced layers on a stationary form to create a composite component. The plurality of sliced layers includes a plurality of hoop tows. One or more overlap splices are formed in each of the plurality of hoop tows. The method includes applying a layup heat to a plurality of target areas on the plurality of sliced layers during the painting. The plurality of target areas is spatially arranged to permit a slippage in the plurality of overlap splices. The method further includes draping the composite component on a curved tool with the plurality of hoop tows oriented perpendicular to an axis of curvature of the curved tool, and applying a curing heat to the composite component after the composite component has been contoured by the curved tool. The curing heat inhibits a further slippage in the plurality of overlap splices.

In one or more embodiments of the method, each of the plurality of overlap splices includes a first segment overlaid with a second segment, the second segment is inside of the plurality of target areas, and the first segment is outside of the plurality of target areas to permit the slippage.

In one or more embodiments of the method, each of the plurality of overlap splices includes a first segment overlaid with a second segment, and both the first segment and the second segment are outside of the plurality of target areas to permit the slippage.

In one or more embodiments of the method, each of the plurality of overlap splices includes an unexposed area in which a first segment is overlaid with a second segment, and the unexposed area is outside of the plurality of target areas to permit the slippage.

In one or more embodiments of the method, the plurality of target areas includes between the plurality of overlap splices, and between the plurality of overlap splices and a plurality of additional tows upon which the plurality of hoop tows is painted.

In one or more embodiments of the method, the plurality of sliced layers includes a plurality of additional tows that are oriented nonparallel to the plurality of hoop tows, each of the plurality of additional tows includes an unexposed area aligned with one or more of the plurality of overlap splices in the plurality of hoop tows, and the unexposed areas are outside of the plurality of target areas to permit shear in the plurality of additional tows when the composite component is draped on the curved tool.

In one or more embodiments of the method, the plurality of hoop tows is painted in a plurality of courses, and the plurality of overlap splices are offset from each other among the plurality of courses.

In one or more embodiments of the method, the plurality of hoop tows is disposed on two or more of the plurality of sliced layers.

In one or more embodiments of the method, the composite component is part of an aircraft.

In one or more embodiments of the method, the stationary form is approximately flat, and the curved tool has a radius from the axis of curvature in a range of approximately 25 inches to approximately 114 inches.

A composite component formed by a method for contour forming in a fiber placement system is provided herein. The method includes painting a plurality of sliced layers on a stationary form to create a composite component. The plurality of sliced layers includes a plurality of hoop tows. One or more overlap splices are formed in each of the plurality of hoop tows. The method includes applying a layup heat to a plurality of target areas on the plurality of sliced layers during the painting. The plurality of target areas is spatially arranged to permit a slippage in the plurality of overlap splices. The method further includes draping the composite component on a curved tool with the plurality of hoop tows oriented perpendicular to an axis of curvature of the curved tool, and applying a curing heat to the composite component after the composite component has been contoured by the curved tool. The curing heat inhibits a further slippage in the plurality of overlap splices.

A manufacturing system is provided herein. The manufacturing system includes an automated-fiber-placement system, a curved tool, a pick-and-place machine, and an autoclave. The automated-fiber-placement system is configured to paint a plurality of sliced layers on a stationary form to create a composite component. The plurality of sliced layers includes a plurality of hoop tows. One or more overlap splices are formed in each of the plurality of hoop tows. The automated-fiber-placement system is configured to apply a layup heat to a plurality of target areas on the plurality of sliced layers during the painting. The plurality of target areas is spatially arranged to permit a slippage in the plurality of overlap splices.

The pick-and-place machine is configured to drape the composite component on a curved tool with the plurality of hoop tows oriented perpendicular to an axis of curvature of the curved tool. The autoclave is configured to apply a curing heat to the composite component after the composite component has been contoured by the curved tool. The curing heat inhibits a further slippage in the plurality of overlap splices.

In one or more embodiments of the manufacturing system, each of the plurality of overlap splices includes a first segment overlaid with a second segment, the second segment is inside of the plurality of target areas, and the first segment is outside of the plurality of target areas to permit the slippage.

In one or more embodiments of the manufacturing system, each of the plurality of overlap splices includes a first segment overlaid with a second segment, and both the first segment and the second segment are outside of the plurality of target areas to permit the slippage.

In one or more embodiments of the manufacturing system, each of the plurality of overlap splices includes an unexposed area in which a first segment is overlaid with a second segment, and the unexposed area is outside of the plurality of target areas to permit the slippage.

In one or more embodiments of the manufacturing system, the plurality of target areas includes between the plurality of overlap splices, and between the plurality of overlap splices and a plurality of additional tows upon which the plurality of hoop tows is painted.

In one or more embodiments of the manufacturing system, the plurality of sliced layers includes a plurality of additional tows that are oriented nonparallel to the plurality of hoop tows, each of the plurality of additional tows includes an unexposed area aligned with one or more of the plurality of overlap splices in the plurality of hoop tows, and the unexposed areas are outside of the plurality of target areas to permit shear in the plurality of additional tows when the composite component is draped on the curved tool.

In one or more embodiments of the manufacturing system, the plurality of hoop tows is painted in a plurality of courses, and the plurality of overlap splices are offset from each other among the plurality of courses.

In one or more embodiments of the manufacturing system, the plurality of hoop tows is disposed on two or more of the plurality of sliced layers.

In one or more embodiments of the manufacturing system, the composite component is part of an aircraft.

The above features and advantages, and other features and advantages of the present disclosure are readily apparent from the following detailed description of the best modes for carrying out the disclosure when taken in connection with the accompanying drawings.

DETAILED DESCRIPTION

This disclosure is susceptible of embodiments in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof. Referring to the drawings, wherein like reference numbers refer to like components.

Embodiments of the present disclosure include a method and/or a manufacturing system that addresses wrinkles in composite layups when draped into contoured locations. The method/system (or technique) produces fiber placement laminations off-line and subsequently contours the laminations with a curved tool, whereas conventional flat-to-curved contouring techniques could lead to buckling. The fiber placement laminations use tows to build a composite component (e.g., a skin or a pad-up). The technique utilizes targeted laser heating of the tows and an introduction of overlap splices in the tows. The overlap splices are introduced in areas of future high contour. The laser heating is controlled to avoid layup heating of the splices in the tows. Thereafter, the splices serve as slip planes during drape forming on a curved tool.

A "tow" is a continuous narrow strip of composite material and may be impregnated with a resin. A "tow" may also be referred to as "slit tow" because it is created by slitting a wide roll. An overlap splice exists where a start of a tow overlaps an end of another tow. In various embodiments, the overlap splices are introduced into the hoop tows with a second pass on top of a first pass during the manufacturing of the composite component. In other embodiments, the overlap splices are present in the hoop tows before the manufacturing of the composite component begins.

Figure 1:
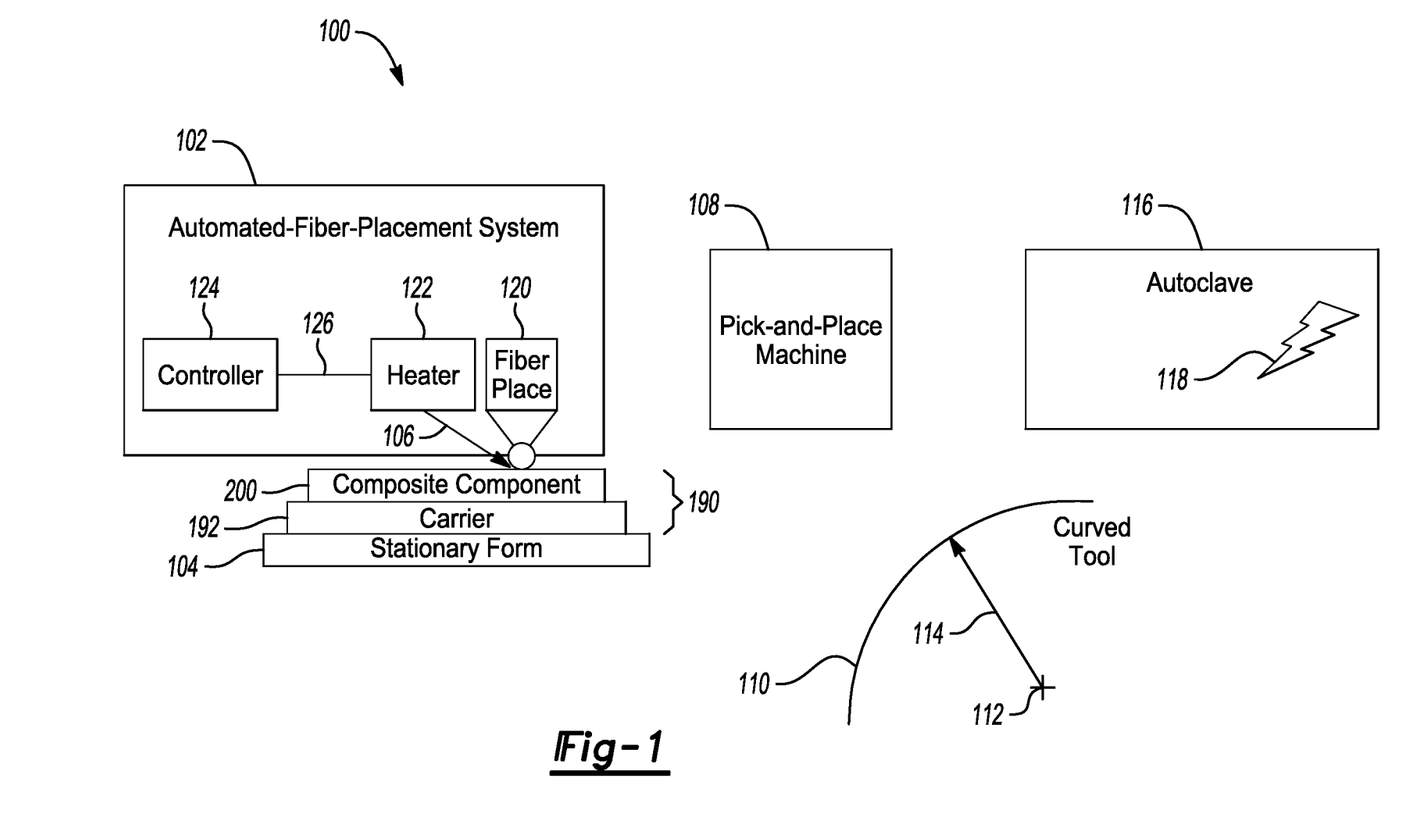
FIG. 1 is a schematic diagram of a manufacturing system in accordance with an exemplary embodiment.

Referring to FIG. 1, a schematic diagram of an example implementation of a manufacturing system 100 is shown in accordance with an exemplary embodiment. The manufacturing system 100 generally includes an automated-fiber-placement (AFP) system 102, a stationary form 104, a layup heat 106, a pick-and-place machine 108, a curved tool 110 that has an axis of curvature 112 and a radius 114, and an autoclave 116 that generates a curing heat 118. The automated-fiber-placement system 102 includes a fiber-placement machine 120, a heater 122, and a controller 124. The manufacturing system 100 is generally operational to create an intermediate component 190 that includes a carrier 192 and a composite component 200. By the end of the manufacturing process, the composite component 200 is separated from the carrier 192.

The automated-fiber-placement system 102 is implemented as a moving machine that lays multiple narrow tows on the stationary form 104. The automated-fiber-placement system 102 is configured to paint a plurality of sliced layers on the stationary form 104 to create the composite component 200. The automated-fiber-placement system 102 is also configured to apply the layup heat 106 to a plurality of target areas on the sliced layers during the painting. The sliced layers include a plurality of hoop (e.g., direction of contour) tows. One or more overlap splices are formed in each of the hoop tows. The target areas are spatially arranged to permit a slippage in the overlap splices. A technique implemented by the automated-fiber-placement system 102 generally reduces a probability of wrinkle formation where the composite component 200 is contoured to a final shape.

The stationary form 104 is implemented as an approximately flat surface. The stationary form 104 is operational to provide a substantially horizontal surface onto which the tows are painted to create the composite component 200.

The layup heat 106 is implemented as an optical beam (or signal). In various embodiments, the layup heat 106 is a laser beam controlled to be scanned in multiple (e.g., two) dimensions across the tows as the tows are being deposited on the stationary form 104. The layup heat 106 warms a portion of the tows previously deposited and/or a portion of the tows being deposited just before, or as the tows pass by a compression roller of the fiber-placement machine 120.

The pick-and-place machine 108 is implemented as a robotic manipulator. The pick-and-place machine 108 is configured to pick up the intermediate component 190 (that includes the composite component 200) from the stationary form 104, and drape (or place) the composite component 200 on the curved tool 110 with the hoop tows oriented perpendicular to the axis of curvature 112 of the curved tool 110. During the pick-and-place activity, rather than having a neutral axis stack up from the inner layers to the outer layers, putting intermediate layers into compression, the overlap splices in the hoop tows allow the hoop tow layer(s) to slip under tension. The slippage effectively softens the pre-cure stiffness of such layers as the composite component 200 is bent by the curved tool 110. In various embodiments, the sliced layers above and below the hoop tow layers may have some amount of give at the hoop tow/tow gaps.

The curved tool 110 is implemented as a curved surface at the radius 114 about the axis of curvature 112. The curved tool 110 is configured to bend the flat composite component 200 into a contoured shape in response to the composite component 200 being pressed against the curved surface. The curved surface may be described for a dominant hoop curvature (e.g., a 90-degree direction). The radius 114 of the curvature may be described in terms of a large radius (e.g., approximately 9.5 feet), a medium radius (e.g., approximately 6 feet), and/or a short radius (e.g., approximately 25 inches). In various embodiments, the curved tool 110 may be representative of a door-surround sized area of a jet aircraft (e.g., a Boeing 787 aircraft, a Boeing 737 aircraft, etc.). In other embodiments, the curved tool 110 may be representative of a horizontal stabilizer loft area of the jet aircraft.

The autoclave 116 is implemented as a curing chamber. The autoclave 116 is configured to apply the curing heat 118 to the composite component 200 after the composite component 200 has been contoured by the curved tool 110. The autoclave 116 may also be configured to cure the contoured composite component 200 under heat, vacuum and/or pressure. An inert atmosphere, such as nitrogen or carbon dioxide, may be provided inside the autoclave 116.

The curing heat 118 is implemented as a controlled heat. The curing heat 118 may be generated by an electric heater, a steam heater, a gas heater, an externally fired heater, or the like. The curing heat 118 inhibits a further slippage in the overlap splices when the composite component 200 is subjected to external forces.

The fiber-placement machine 120 is implemented as a composite ply placement machine. The fiber-placement machine 120 is generally operational to paint (or deposit) multiple sliced layers of the tow onto the carrier 192. The tow may be deposited in multiple layers. In various embodiments, the sliced layers may be created with the tows oriented at particular angles (e.g., +45 degrees, 0 degrees, −45 degrees, and 90 degrees) relative to a planned orientation of the composite component 200. In other embodiments, the tows may be oriented at other angles (e.g., +60 degrees, 0 degrees, −60 degrees, and 90 degrees) relative to a planned orientation of the composite component 200. Other angles and/or other numbers of the angles may be implemented to meet the design criteria of a particular application.

The fiber-placement machine 120 may include, but is not limited to, a head, a compaction roller, a bulk reel of the composite ply, one or more guide rollers, and/or a drive mechanism for urging the compaction roller. The head of the fiber-placement machine 120 generally brings together a set of the tows. The set is then feed to the compaction roller. The compaction roller presses the tows onto the stationary form 104.

The heater 122 is implemented as an optical heater. The heater 122 is configured to generate the optical signal that provides the layup heat 106. In various embodiments, the heater 122 may be a continuous-wave laser modulated to achieve a specified pulse frequency. In some embodiments, the heater 122 may be a pulse laser that emits at a specified pulse frequency.

The controller 124 is implemented as a processor circuit (e.g., one or more microprocessors). The controller 124 may be configured to control application and scanning of the layup heat 106. The controller 124 is operational to communicate with the heater 122 via the control lines 126. Control of the layup heat 106 may include, but is not limited to, control over an optical power, a pulse frequency, and a spatial direction of the optical signal.

The control lines 126 are implemented as one or more electrical wires and/or busses. The control lines 126 are generally operational to provide bidirectional communication between the controller 124 and the heater 122.

The intermediate component 190 is implemented as the composite component 200 residing on the carrier 192. In various embodiments, the carrier 192 may be formed of thermoplastic materials, plexiglass, oil palm fiber (OPF) latex, or similar materials. The carrier 192 is removable from the composite component 200 near an end of the manufacturing process.

The composite component 200 is implemented as a structural part of a vehicle or an object. In various embodiments, the vehicle may be an aircraft, an automobile, a truck, a boat, or the like. The object may be a container, a covering, a shelter, or the like. The composite component 200 may be implemented as parts of other types vehicles or objects to meet a design criteria of a particular application.

In designs where the composite component 200 is implemented as a thick pad-up area, a baseline layup and drape may be performed with an initial thin composite component on the curved tool 110. The carrier 192 may subsequently be removed. One or more additional thin composite components may be formed and draped on the initial composite component 200 at decreasing curvatures (e.g., increasing radii 114). After the thin composite components have been joined together on the curved tool 110, the resulting composite component 200 may be moved to the autoclave 116 for curing.

Figures 2, 3, 4:
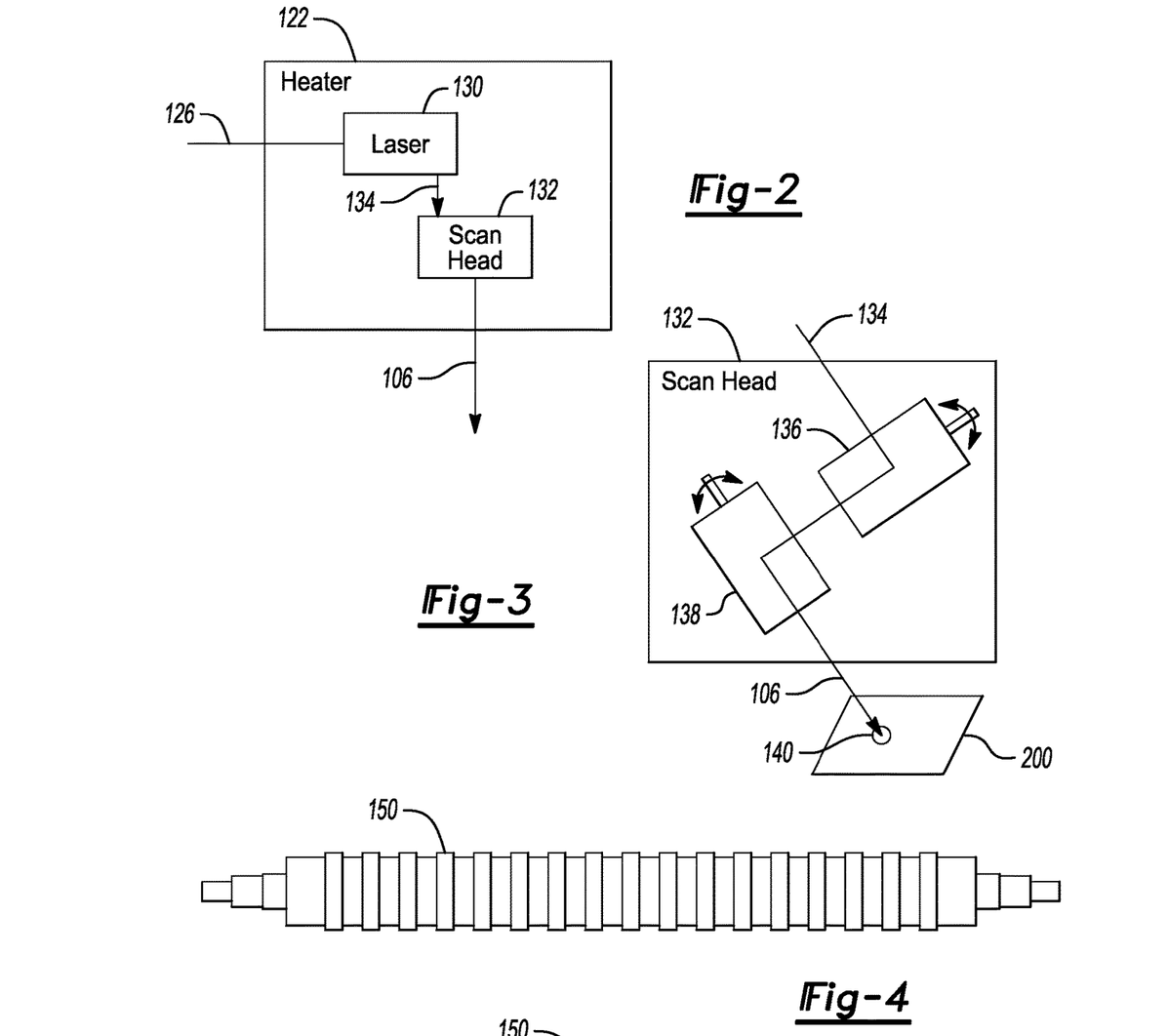
FIG. 2 is a schematic diagram of a heater in accordance with an exemplary embodiment.
FIG. 3 is a schematic diagram of a scan head in accordance with an exemplary embodiment.
FIG. 4 is a side view schematic diagram of a restart drive roller in accordance with an exemplary embodiment.

Referring to FIG. 2, a schematic diagram of an example implementation of the heater 122 is shown in accordance with an exemplary embodiment. The heater 122 includes a laser 130 and a scan head 132. A laser light 134 generated by the laser 130 is transferred to the scan head 132. The scan head 132 is configured to spatially direct the laser light 134 to aim the layup heat 106 within the target area.

The laser 130 may implement an optical laser. The laser 130 is configured to generate the laser light 134 in response to controls received over the control lines 126. The laser 130 may be implemented as a continuous-wave laser or a pulse laser.

The scan head 132 may implement a multidimensional (e.g., two-dimensional) optical scanner. The scan head 132 is configured to direct the laser light 134 to the sliced layer being deposited in response to control signals received from the control lines 126.

The laser light 134 generally has a wavelength that is absorbed by and warms one or two sliced layers. In various embodiments, the wavelength may range from about 0.75 micrometers (um) to about 1.4 um (e.g., near infrared). In other embodiments, the wavelength may range from about 1.4 um to about 3 um (e.g., short-wavelength infrared). In some embodiments, the wavelength may range from about 3 um to about 8 um (e.g., mid-wavelength infrared). In still other embodiments, the wavelength may range from about 8 um to about 15 um (e.g., long-wavelength infrared). The wavelength may range from about 15 um to about 1,000 um (e.g., far infrared).

Referring to FIG. 3, a schematic diagram of an example implementation of the scan head 132 is shown in accordance with an exemplary embodiment. The scan head 132 includes a first mirror 136 and a second mirror 138. The first mirror 136 and the second mirror 138 are configured to rotate about different axes to provide the multidimensional scanning.

The first mirror 136 is generally operational to redirect the laser light 134 from the laser 130 to the second mirror 138. The second mirror 138 may be operational to redirect the laser light 134 from the first mirror 136 onto the composite component 200. The laser light 134 generally provides the layup heat 106 to a heated area 140 on an exposed surface of the composite component 200. Rotational movement of the first mirror 136 and the second mirror 138 provide spatial movement of the heated area 140. While the laser light 134 is active, the heated area 140 may be scanned through multiple targeted areas to heat the tows being deposited by the fiber-placement machine 120. The laser light 134 is extinguished while the scan head 132 points into multiple unexposed (or non-heated) areas (e.g., the splices in the hoop tows).

Referring to FIG. 4, a side view schematic diagram of an example implementation of a restart drive roller 150 is shown in accordance with an exemplary embodiment. The restart drive roller 150 is a mechanism inside the head of the fiber-placement machine 120 that is a component of a tow add subsystem. The restart drive roller 150 includes a driven textured shaft and operates with a series of (typically pneumatic) actuated roller clamps.

Figure 5:
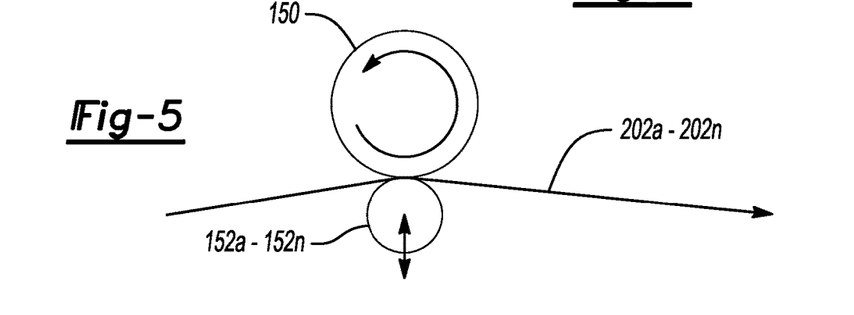
FIG. 5 is an end view schematic diagram of the restart drive roller and multiple roller clamps in accordance with an exemplary embodiment.

Referring to FIG. 5, an end view schematic diagram of an example implementation of the restart drive roller 150 and multiple roller clamps 152a-152n is shown in accordance with an exemplary embodiment. Each tow 202a-202n being painted has a dedicated roller clamp 152a-152n. When actuated, the roller clamps 152a-152n press the tows 202a-202n against the shaft of the restart drive roller 150, which subsequently drives the material toward an exit of the head. Once the tows 202a-202n have achieved a predetermined amount of laydown and adequate tack exists between the tows 202a-202n and the substrate, the roller clamps 152a-152n disengage, and the material may be feed based on tension.

Figure 6:
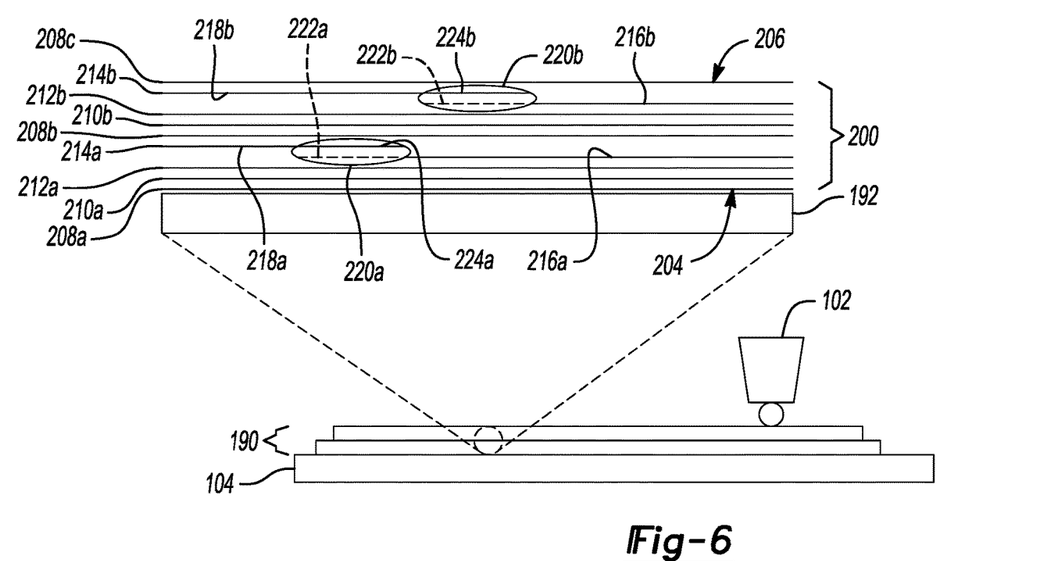
FIG. 6 is an enlarged partial sectional view schematic diagram of an intermediate component being fabricated in accordance with an exemplary embodiment.

Referring to FIG. 6, an enlarged partial sectional view schematic diagram of an example fabrication of an intermediate component 190 is shown in accordance with an exemplary embodiment. The intermediate component 190 includes the carrier 192 and the composite component 200. The carrier 192 is generally disposed on the stationary form 104.

The automated-fiber-placement system 102 paints the sliced layers onto the carrier 192 thereby building up the composite component 200 layer by layer.

A first side 204 (e.g., a bottom side as illustrated) of the composite component 200 adjoins the carrier 192. A second side 206 (e.g., a top side as illustrated) of the composite component 200 faces away from the first side 204. The composite component 200 includes multiple sliced layers of tows 208a-214b. The various tows 208a-214b are aligned in multiple (e.g., 2 to 4) directions.

In the example embodiment, the tows 208a-208c are aligned at +45 degrees relative to the axis of curvature 112. The tows 210a-210b are aligned at zero degrees relative to the axis of curvature 112. The tows 212a-212b are aligned at −45 degrees relative to the axis of curvature 112. The hoop tows 214a-214b are aligned at 90 degrees relative to the axis of curvature 112.

An initial +45-degree tow 208a is formed on the carrier 192. An initial 0-degree tow 210a is formed on the +45-degree tow 208a. An initial −45-degree tow 212a is formed on the 0-degree tow 210a. An initial 90-degree hoop tow 214a is formed on the 0-degree tow 210a. The sequence of tows is generally repeated with a subsequent +45-degree tow 208b, a 0-degree tow 210b, a −45-degree tow 212b, a 90-degree hoop tow 214b, and another +45-degree tow 208c. Other sequences and/or numbers of the sliced layers may be implemented to meet the design criteria of a particular application.

Multiple (e.g., two illustrated) overlap splices 220a-220b are created in the hoop tows 214a-214b in the direction of curvature. Each hoop tow 214a-214b includes one or more of the overlap splices 220a-220b. The overlap splices 220a-220b are formed where first layups 216a-216b are overlaid with second layups 218a-218b of the respective hoop tows 214a-214b. The overlaid regions are referred to as first segments 222a-222b (e.g., the lower segments as illustrated) and second segments 224a-224b (e.g., the upper segments as illustrated). The overlap splices 220a-220b in different sliced layers may be spatially staggered relative to each other The first segments 222a-222b are shown as dashed lines. The dashed lines generally highlight where the layup heat 106 is absent during the lamination of the tows 208a-214b. The layup heat 106 is absent between the first segments 222a-222b and the second segments 224a-224b to prevent the tackiness from being established inside the overlap splices 220a-220b. The layup heat 106 may also be absent between adjacent overlap splices 220a-220b within the same sliced layers.

The layup heat 106 may be absent in specific areas between other sliced layers. In various embodiments, the layup heat 106 may be absent from areas between the first segments 222a-222b and the corresponding −45-degree tows 212a-212b (e.g., below the overlap splices 220a-220b as illustrated). The laser light 134 may also be switched off in areas between the second segments 224a-224b and the corresponding +45-degree tows 208b-208c (e.g., above the overlap splices 220a-220b as illustrated).

Figure 7:
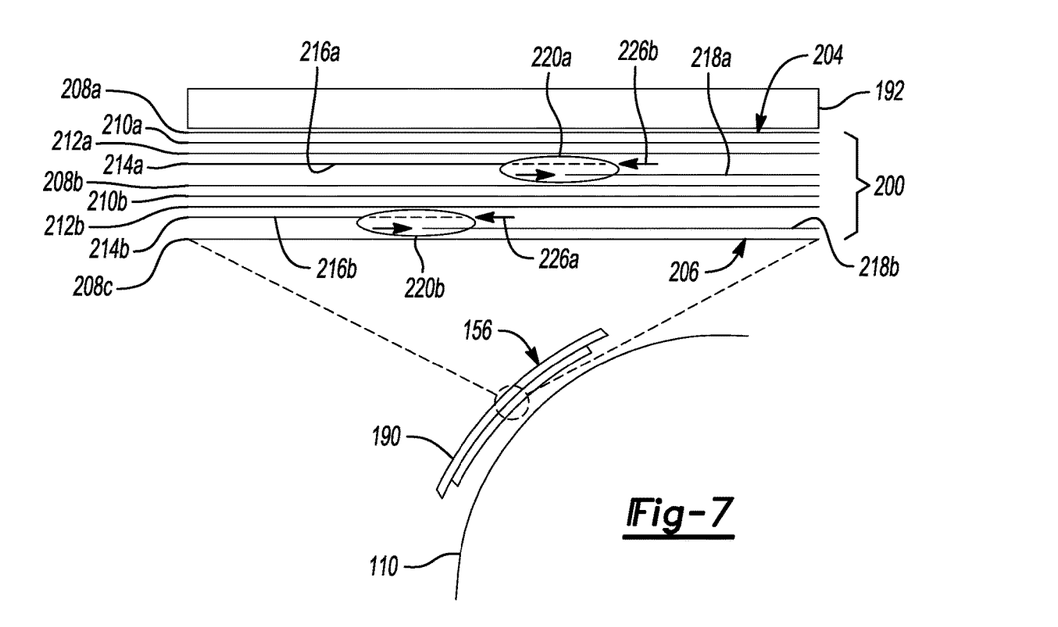
FIG. 7 is an enlarged partial sectional view schematic diagram of the intermediate component being curved in accordance with an exemplary embodiment.

Referring to FIG. 7, an enlarged partial sectional view schematic diagram of an example curving of the intermediate component 190 is shown in accordance with an exemplary embodiment. After the intermediate component 190 has been fabricated on the stationary form 104, the pick-and-place machine 108 may pick the intermediate component 190 off of the stationary form 104, rotate the intermediate component 190 such that the second side 206 is facing the curved tool 110, and place the intermediate component 190 onto the curved tool 110. FIG. 7 generally shows the intermediate component 190 rotated clockwise relative to FIG. 6 such that the left side of FIG. 6 is now on the right side of FIG. 7.

A pressure 156 may be applied to the intermediate component 190 to press the second side 206 of the composite component 200 against a contoured surface of the curved tool 110. As the intermediate component 190 is draped onto the contoured surface of the curved tool 110, the overlap splices 220a-220b in the hoop tows 214a-214b slip to compensate for the different arc lengths. The slippage is generally illustrated by arrows 226a-226b.

Estimated slip calculations for different numbers of slip layers (or plies), different numbers of hoop tows 214a-214b, different total thicknesses, and different numbers of overlap splices 220a-220b per layer is provided in Table I as follows:

TABLE I

| No. of Layers | 12 | 12 | 24 | 24 | 32 | 32 |
| Layers of 90° tow | 3 | 3 | 6 | 6 | 8 | 8 |
| Total Thickness | 0.09 | 0.09 | 0.18 | 0.18 | 0.24 | 0.24 |
| No. of Splices | 1 | 5 | 1 | 5 | 1 | 5 |
| Final Radius (inches) | 25 | 25 | 25 | 25 | 25 | 25 |
| Outer Chord (inches) | 24 | 24 | 24 | 24 | 24 | 24 |
| Radii Ratio | 1.0036 | 1.0036 | 1.0072 | 1.0072 | 1.0096 | 1.0096 |
| Slip Length | 0.0864 | 0.01728 | 0.1728 | 0.03456 | 0.2304 | 0.04608 |

Figure 8:
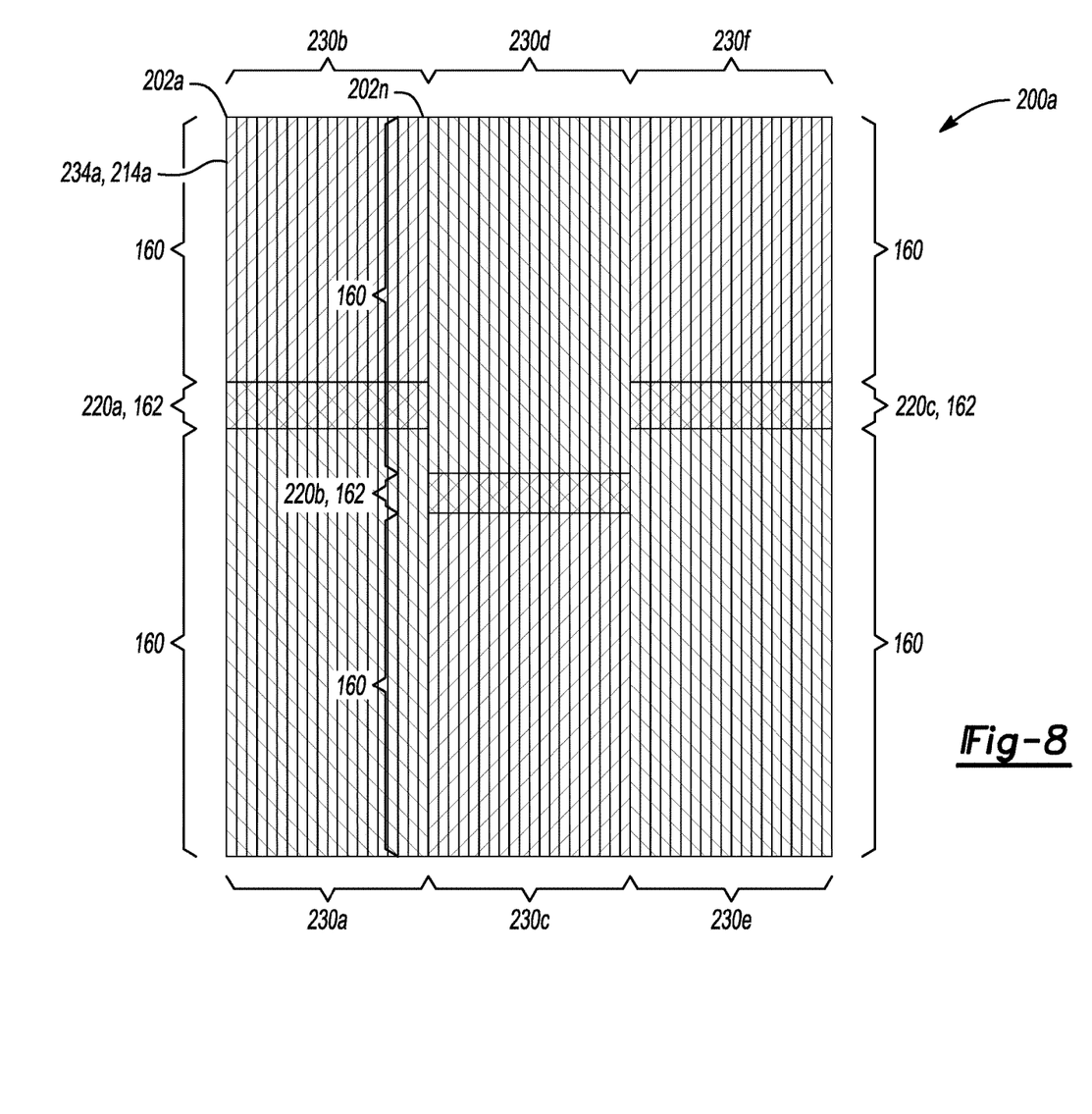
FIG. 8 is a schematic plan diagram of a composite component in accordance with an exemplary embodiment.

Referring to FIG. 8, a schematic plan diagram of an example implementation of a composite component 200a is shown in accordance with an exemplary embodiment. The composite component 200a may be representative of the composite component 200. A hoop layer 234a of the hoop tows 214a arranged in multiple courses 230a-230f is illustrated. Each course 230a-230f includes multiple tows 202a-202n. The courses 230a-230f may be deposited in a common direction.

Corresponding pairs of the courses 230a-230f form the overlap splices 220a-220c. For example, a start of the course 230b overlaps an end of the course 230a to form the overlap splice 220a. A start of the course 230d overlaps an end of the course 230c to form the overlap splice 220b, and so on. Some of the overlap splices, such as 220a and 220c, may be spatially aligned with each other in a planar surface of the hoop layer 234a. Some of the overlap splices, such as 230b, may be spatially staggered relative to other overlap splices, such as 230a.

During deposition of the hoop layer 234a on a substrate layer (e.g., a previously deposited layer of the −45-degree tows 212a-212n), the layup heat 106 may be applied in multiple target areas 160 to provide tackiness between the hoop layer 234a and the substrate layer. The target areas 160 generally cover the areas (or regions) outside of the overlap splices 220a-220c. Each overlap splice 220a-220c resides in a corresponding unexposed area 162 that is outside of the target areas 160. The unexposed areas 162 are not subject to the layup heat 106 from the heater 122. Therefore, the unexposed areas 162 do not acquire the tackiness between the overlapping courses 230a-230f. As the composite component 200a is draped onto the curved tool 110, the lack of tackiness in the overlap splices 220a-220c allows the overlapping courses 230a-230f to slip relative to each other along the direction of the curvature.

Figure 9:
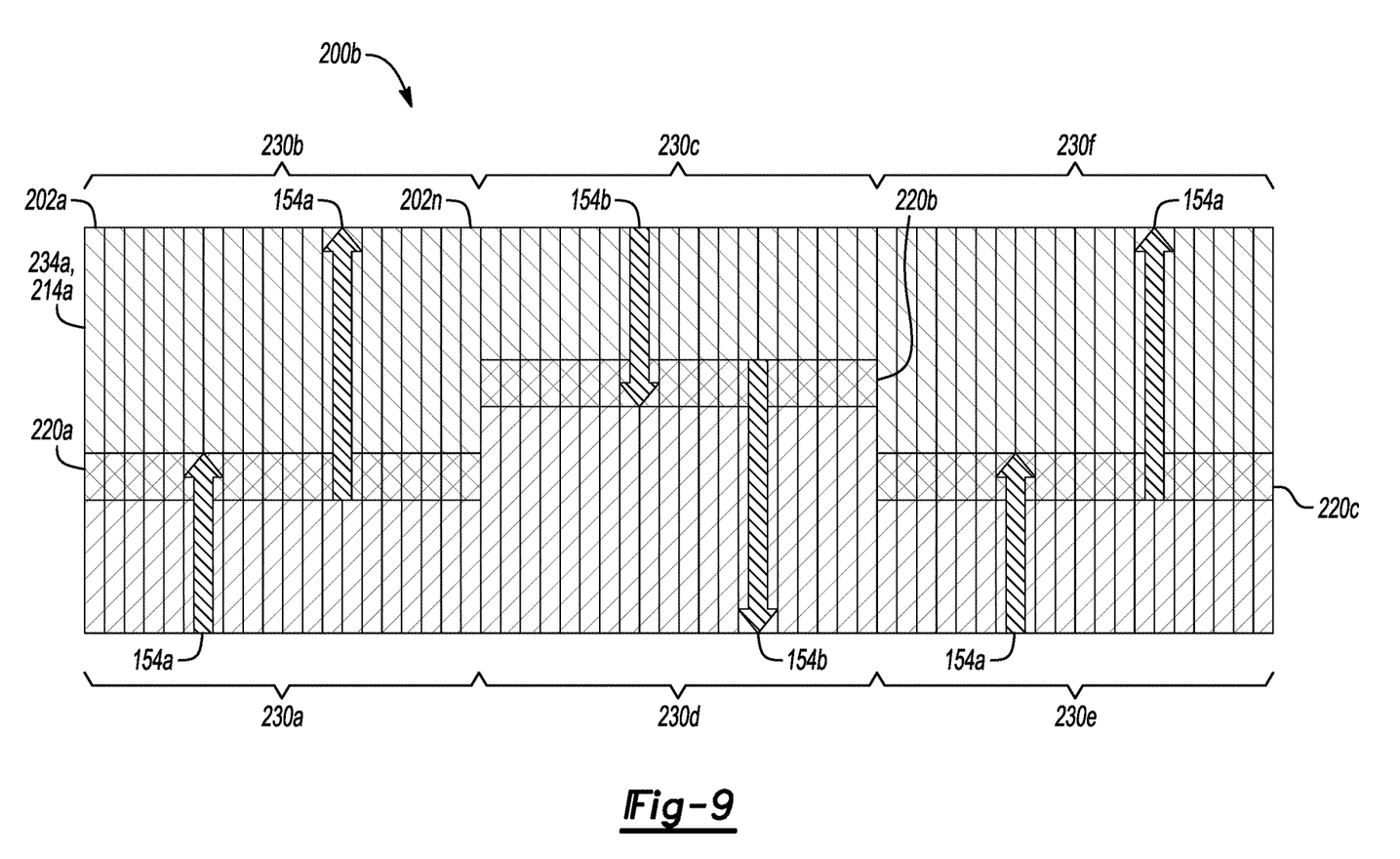
FIG. 9 is a schematic plan diagram of another composite component in accordance with an exemplary embodiment.

Referring to FIG. 9, a schematic plan diagram of an example implementation of another composite component 200b is shown in accordance with an exemplary embodiment. The composite component 200b may be representative of the composite components 200 and/or 200a. The hoop layer 234a of the hoop tows 214a with the multiple courses 230a-230f is illustrated. Each course 230a-230f includes multiple tows 202a-202n.

Adjacent courses 230a-230f may be deposited in opposite directions 154a-154b. For example, the courses 230a-230b may be deposited in a first direction 154a. The courses 230c-230d may be deposited in a second direction 154b. The courses 230e-230f may be deposited in the first direction 154a.

Figure 10:
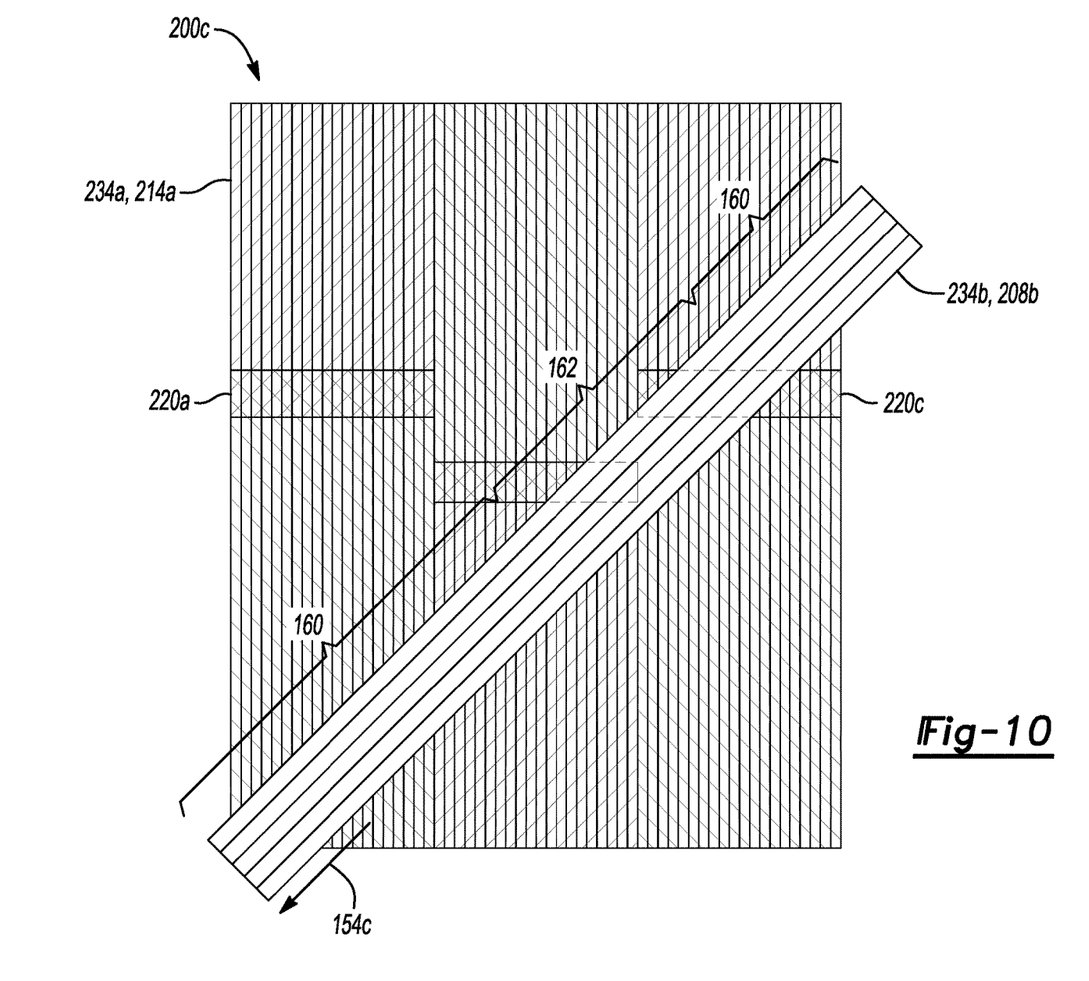
FIG. 10 is a schematic plan diagram of still another composite component in accordance with an exemplary embodiment.

Referring to FIG. 10, a schematic plan diagram of an example implementation of still another composite component 200c is shown in accordance with an exemplary embodiment. The composite component 200c may be representative of the composite components 200, 200a and/or 200b. The hoop layer 234a of the hoop tows 214a organized in the multiple courses 230a-230f is illustrated. Each course 230a-230f includes multiple tows 202a-202n. Every other course 230a-230f is deposited in opposite directions 154a-154b.

The target areas 160 receiving the layup heat 106 may be controlled while the additional layer 234b is being formed to avoid warming the hoop layer 234a (and optionally the additional layer 234b) where the additional layer 234b crosses the overlap splices 220a-220c. Other portions of the additional layer 234b are inside the target areas 160 to obtain the tackiness between the additional layer 234b and the hoop layer 234a. In the example, the tows 208b in the additional layer 234b are shown in the unexposed areas 162 corresponding to the overlap splices 220b-220c in the hoop layer 234a. The absence of the tackiness between the hoop layer 234a and the additional layer 234b around the overlap splices 220a-220c generally reduces shear of the additional tows 208b when the overlap splices 220a-220c are stretched by the curved tool 110. The reduced shear may avoid buckling of the additional tows 208b.

Figure 11:
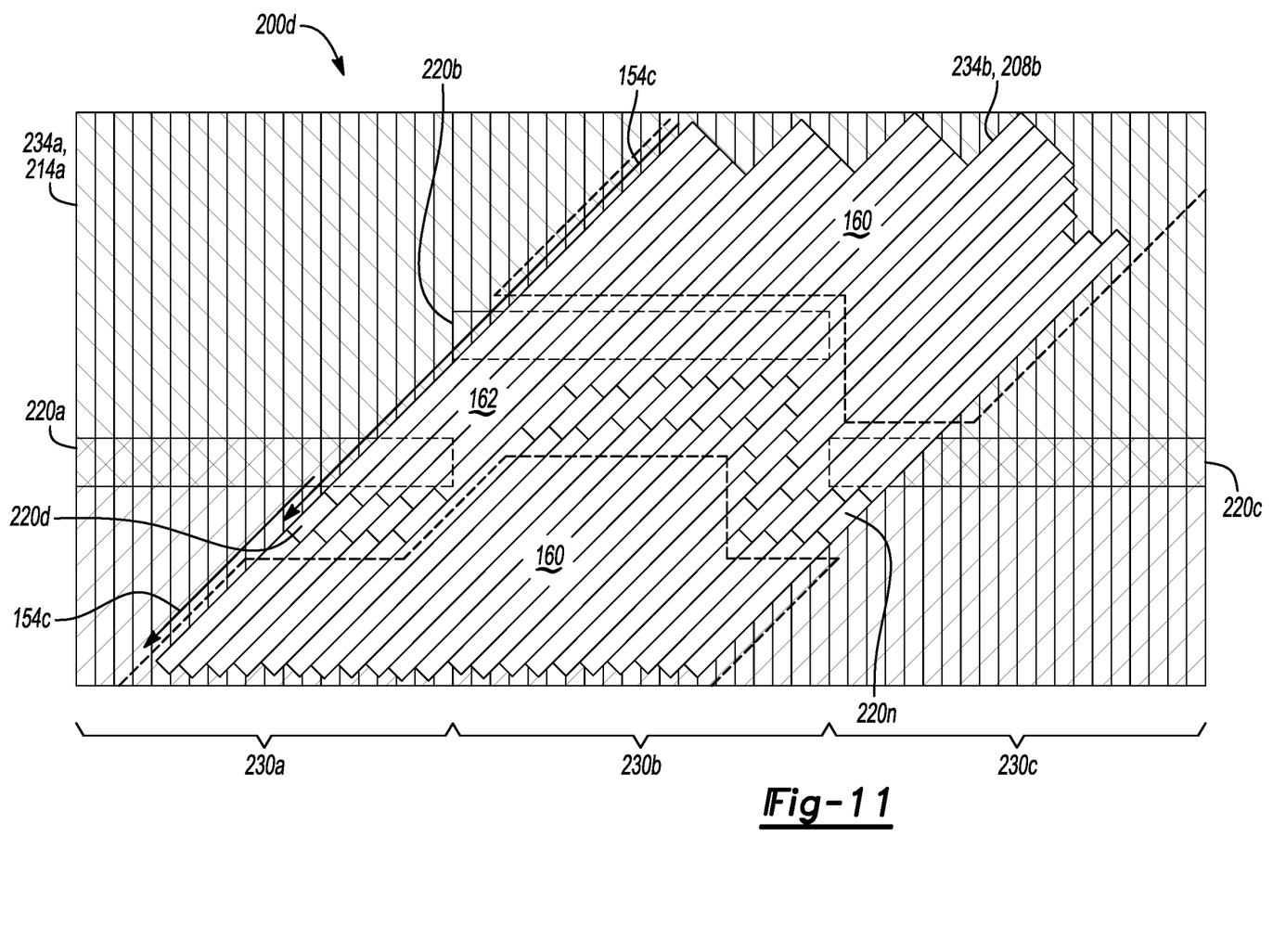
FIG. 11 is a schematic plan diagram of yet another composite component in accordance with an exemplary embodiment.

Referring to FIG. 11, a schematic plan diagram of an example implementation of yet another composite component 200d is shown in accordance with an exemplary embodiment. The composite component 200d may be representative of the composite components 200, 200a, 200b, and/or 200c. The hoop layer 234a of the hoop tows 214a and the additional layer 234b of additional tows 208b is illustrated. The hoop layer 234a may include the overlap splices 220a-220c. The additional layer 234b may include additional overlap splices 220d-220n. The additional layer 234b may be deposited in a third direction 154c.

The target areas 160/unexposed areas 162 may be controlled to avoid warming the additional layer 234b over the overlap splices 220a-220c in the hoop layer 234a. The target areas 160/unexposed areas 162 may also be controlled to avoid warming the overlap splices 220d-220n formed in the additional layer 234b. Therefore, the overlap splices 220d-220n may also slip when the composite component 200d is draped on the curved tool 110. In various embodiments, the overlap splices 220d-220n may help accommodate complex contours that curve in multiple dimensions.

Figure 12:
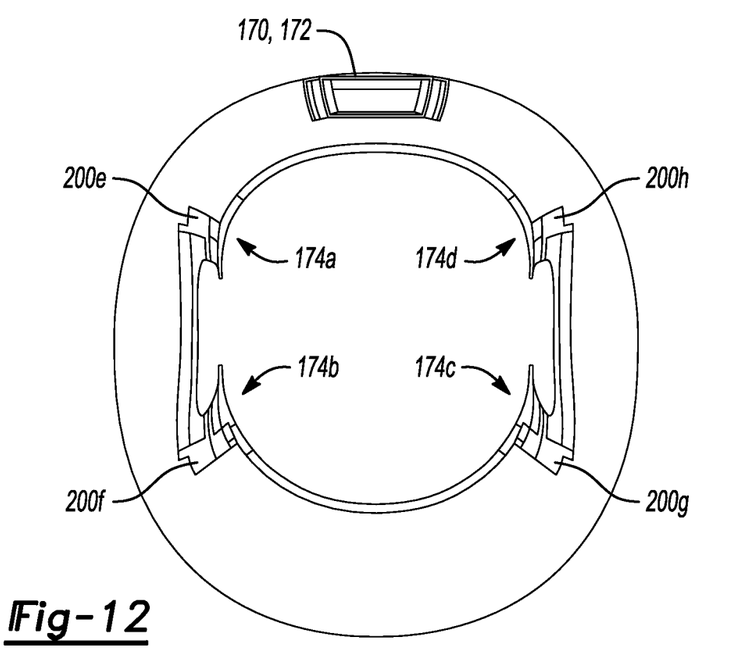
FIG. 12 is a schematic front view diagram of a fuselage section of a vehicle in accordance with an exemplary embodiment.

Referring to FIG. 12, a schematic front view diagram of an example implementation of a fuselage section 170 of a vehicle or object 172 is shown in accordance with an exemplary embodiment. In the example, the vehicle/object 172 may be an aircraft. The fuselage section 170 include multiple (e.g., 4) stabilizer loft areas 174a-174d. A radius of curvature may approach 25 inches throughout the stabilizer loft areas 174a-174d. Other radii of curvature may be implemented to meet the design criteria of a particular application.

Figure 13:
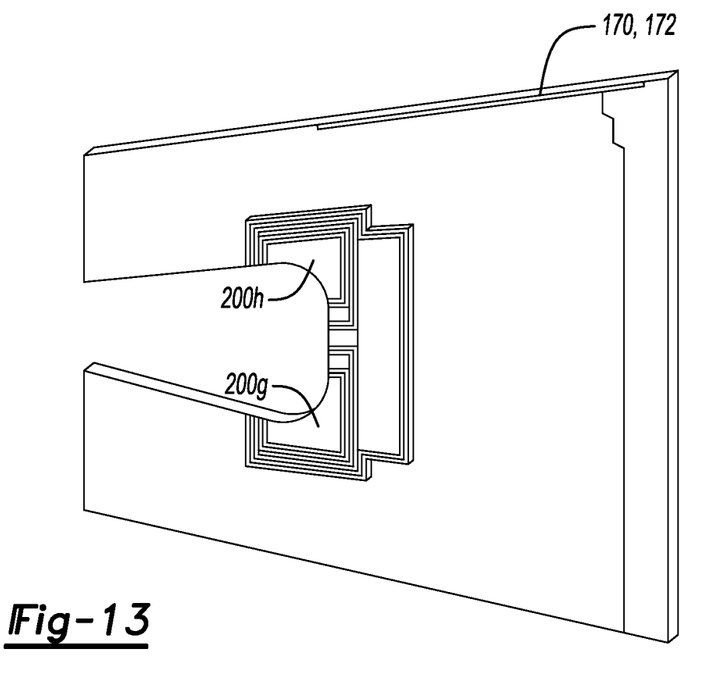
FIG. 13 is a schematic perspective diagram of the fuselage section in accordance with an exemplary embodiment.

Referring to FIG. 13, a schematic perspective diagram of an example portion of the fuselage section 170 of the vehicle/object 172 is shown in accordance with an exemplary embodiment. Composite components 200e-200h may be mounted in the stabilizer loft areas 174a-174d. Each composite component 200e-200h may be representative of the composite components 200, 200a, 200b, 200c, and/or 200d. In various embodiments, the composite components 200e-200h may be thicker than the surrounding composite panels to accommodate higher localized stresses. The overlap splices 220a-220n in the composite components 200e-200h generally allow for the formation of fewer wrinkles when the composite components 200e-200h are bent on the curved tool 110.

Figure 14:
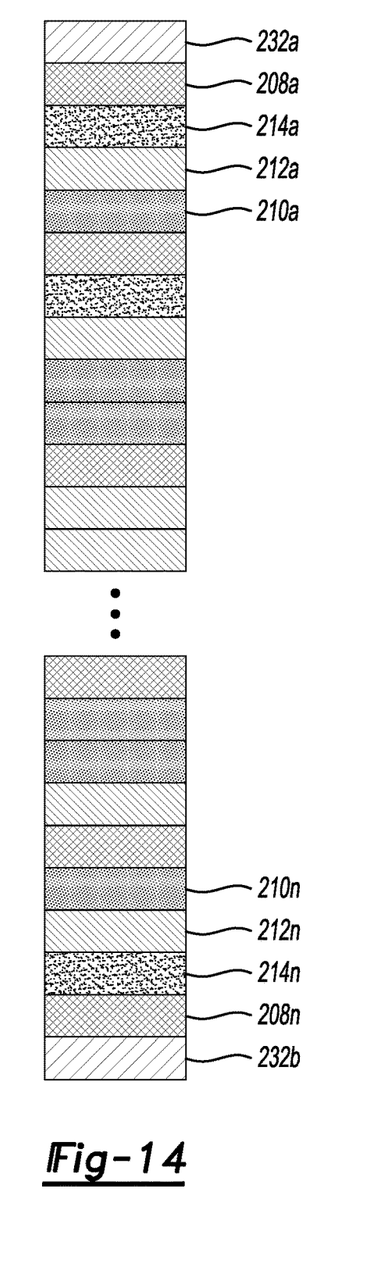
FIG. 14 is a schematic cross-section diagram of a slice through the composite component in accordance with an exemplary embodiment.

Referring to FIG. 14, a schematic cross-section diagram of an example slice through the composite component 200h is shown in accordance with an exemplary embodiment. A thickness of the composite component 200h generally varies from many (e.g., 108) layers (or plies P) to several (e.g., 10) layers. The layers may include the various tows 208a-208n, 210a-210n, 212a-212n, and 214a-214n. Cover layers 232a-232b may be included around the tows 208a-214n.

In the example, the composite component 200h has multiple layers of the hoop tows 214a-214n. A pattern of the layers may be interleaved in the example. In some embodiments, various layers may be repeated on adjoining layers. In other embodiments, the pattern of the layers may be symmetrical. In other embodiments, the pattern of the layers may be asymmetrical. Other numbers of layers and/or other patterns of the layers may be implemented to meet the design criteria of a particular application.

Figure 15:
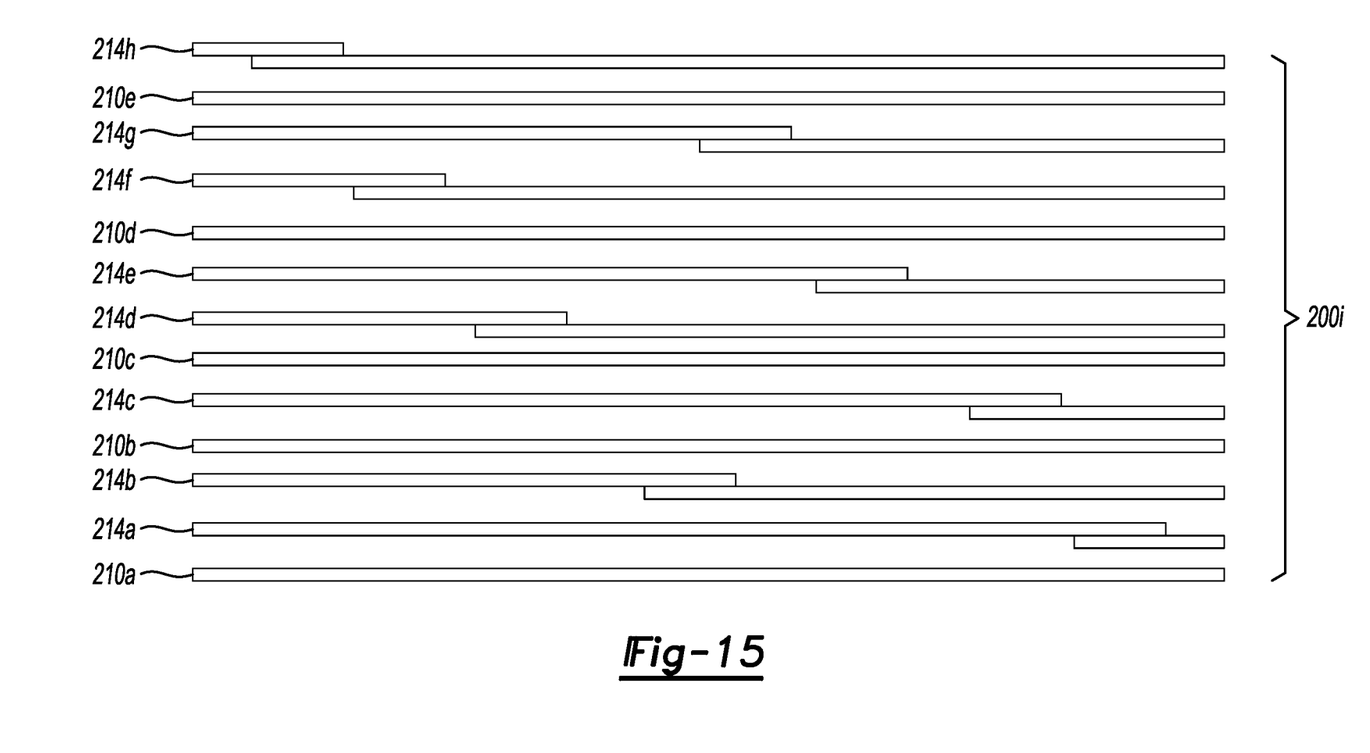
FIG. 15 is an enlarged partial sectional view schematic diagram of a composite component in accordance with an exemplary embodiment.

Referring to FIG. 15, an enlarged partial sectional view schematic diagram of an example composite component 200i is shown in accordance with an exemplary embodiment. The composite component 200i may be representative of various embodiments of the composite components 200-200h. The composite component 200i includes two types of layers, multiple 0-degree tows 210a-210e and multiple hoop tows 214a-214h.

In the example embodiment, multiple (e.g., eight illustrated) overlap splices are created in the hoop tows 214a-214h and are aligned in the direction of the curvature. Each hoop tow 214a-214h includes one or more of the overlap splices configured to slip in the same direction. The overlap splices in different sliced layers may be spatially staggered relative to each other. Some of the hoop tows 214a-214h may form adjoining layers (e.g., 214a-214b, 214d-214e, and 214f-214g). Other hoop tows 214a-214h (e.g., 214c) may be surrounded by the 0-degree tows 210a-210e (e.g., 210b-210c). Other sequences of tows, other numbers of the different types of tows, and/or other total numbers of the tows may be implemented to meet a design criteria of a particular application.

Figure 16:
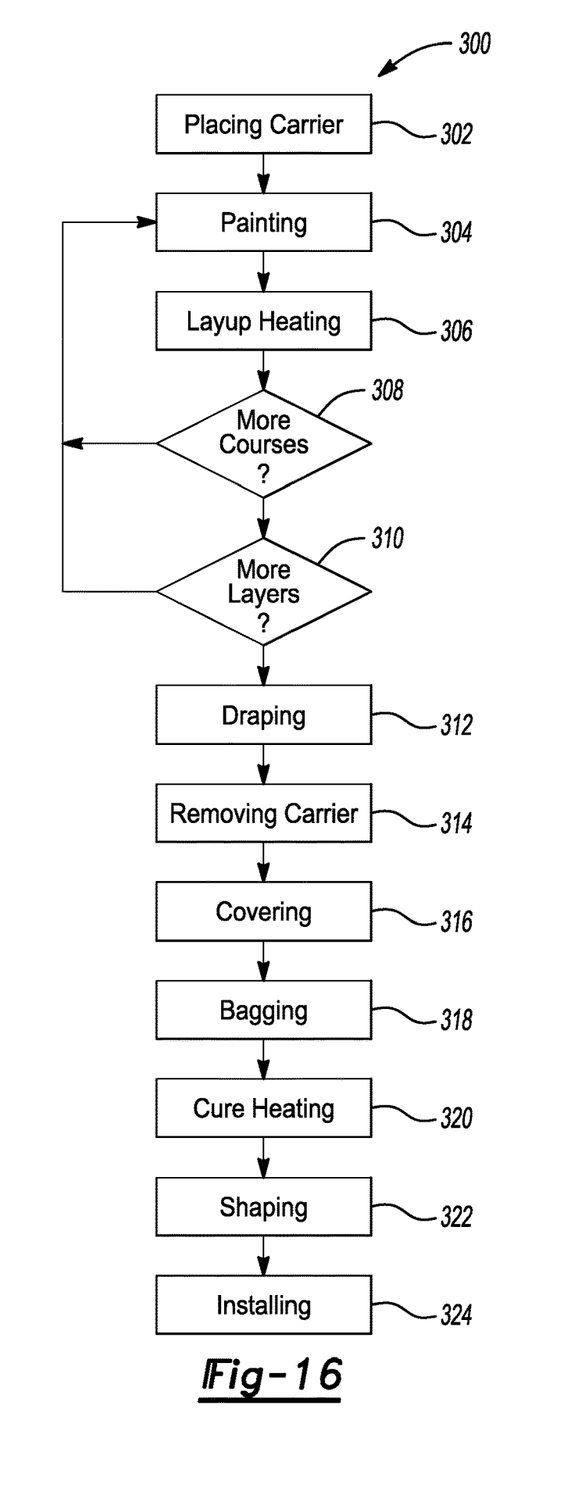
FIG. 16 is a flow diagram of a method for contour forming in a fiber placement system in accordance with an exemplary embodiment.

Referring to FIG. 16, a flow diagram of an example implementation of a method 300 for contour forming in a fiber placement system is shown in accordance with an exemplary embodiment. The method (or process) 300 may be implemented by the manufacturing system 100. The method generally includes a step 302, a step 304, a step 306, a step 308, a step 310, a step 312, a step 314, a step 316, a step 318, a step 320, a step 322, and a step 324. The sequence of steps is shown as a representative example. Other step orders may be implemented to meet the criteria of a particular application.

In the step 302, the carrier 192 may be placed on the stationary form 104. Multiple sliced layers 234a-234b are painted on the carrier 192 (on the stationary form 104) by the automated-fiber-placement system 102 to create the composite component 200 in the step 304. The sliced layers 234a-234b include multiple hoop tows 214a-214n. One or more overlap splices 220a-220n are formed in each of the plurality of hoop tows 214a-214n. As the hoop tows 214a-214n are being deposited, the layup heat 106 is applied in the step 306 to multiple target areas 160 on the sliced layers during the painting. The target areas 160 are spatially arranged to permit a slippage in the overlap splices 220a-220d when the composite component 200 is draped on the curved tool 110.

A check is performed in the step 308 to determine if more courses should be laid. If more courses are to be deposited, the method 300 returns to the step 304 to paint the additional courses. If the specified courses in a current layer have already been deposited, the method 300 continues with the step 310.

A check is performed in the step 310 to determine if more layers should be added. If more layers are specified, the method 300 returns to the step 304 to paint the additional layers. If the layers have already been deposited, the method 300 continues with the step 312.

In the step 312, the pick-and-place machine 108 drapes the composite component 200 on the curved tool 110 with the hoop tows 214a-214n oriented perpendicular to the axis of curvature 112 of the curved tool 110. The pressure 156 is applied to the carrier 192 to conform the composite component 200 to the contours of the curved tool 110. The carrier 192 is removed from the composite component 200 in the step 314. The cover layers 232a-232b may be applied in the step 316 to continue fabrication of the composite component 200. The cover layers 232a-232b generally provided for protection, for example lightning strike protection and/or ultraviolet light protection.

An application of cure bagging materials may be performed in the step 318 to protect the composite component 200 during a subsequent cure. The curved composite component 200 is subsequently moved into the autoclave 116. While in the autoclave 116, the curing heat 118 is applied to the composite component 200 in the step 320 (after the composite component has been contoured by the curved tool 110). The curing heat 118 inhibits a further slippage in the overlap splices 220a-220n. In the step 322, the composite component 200 is shaped to specified dimensions. In the step 324, the finished composite component 200 may be installed on the vehicle/object 172.

Embodiments of the present disclosure may result in a reduction in tooling cost for pick and place since contoured forms are replaced by the flat stationary form 104. The layer stack up with overlap splicing generally improves drapability of the flat intermediate components 190. A head pressure of the automated-fiber-placement system 102 on subsequent tows may impact the available slippage. Therefore, a head pressure during open laydown may be reduced, a hardness of the roller may be tailored and/or less-ideally segmented rollers may be utilized in the fabrication. A tensioning on the tows may be reduced in the area of the adjacent plies to impact available slippage. In some situations, a temperature of the materials may also be adjusted to control the slippage during the laydown. Subsequent laydown course directions may be tailored to avoid roll-over wraps. In various embodiments, the processing may be done in a "fish scale" method in order to prevent fold-over tows and/or lift-off tows. The method and/or system may result in cost saving and/or weight savings.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for contour forming in a fiber-placement system, the method comprising:
   depositing a plurality of sliced layers on a stationary form to create a composite component, wherein the plurality of sliced layers includes a plurality of hoop tows, and one or more overlap splices are formed in each of the plurality of hoop tows, and the stationary form is approximately flat;
   applying a layup heat to a plurality of target areas on the plurality of sliced layers during the depositing;
   withholding the layup heat in a plurality of unexposed areas, wherein the plurality of target areas and the plurality of unexposed areas are spatially arranged to permit a slippage in the plurality of overlap splices;
   draping the composite component on a curved tool with the plurality of hoop tows oriented perpendicular to an axis of curvature of the curved tool, wherein the plurality of overlap splices in the plurality of unexposed areas slip to conform the composite component to the curved tool; and
   applying a curing heat to the composite component after the composite component has been contoured by the curved tool, wherein the curing heat inhibits a further slippage in the plurality of overlap splices.

2. The method according to claim 1, wherein the plurality of sliced layers are deposited whereby each of the plurality of overlap splices includes a first segment overlaid with a second segment, the second segment is inside of the plurality of target areas, and the first segment is outside of the plurality of target areas to permit the slippage.

3. The method according to claim 1, wherein the plurality of sliced layers are deposited whereby each of the plurality of overlap splices includes a first segment overlaid with a second segment, and both the first segment and the second segment are outside of the plurality of target areas to permit the slippage.

4. The method according to claim 1, wherein the plurality of sliced layers are deposited whereby each of the plurality of overlap splices includes at least one unexposed area of the plurality of unexposed areas in which a first segment is overlaid with a second segment, and the unexposed area is outside of the plurality of target areas to permit the slippage.

5. The method according to claim 1, wherein the plurality of sliced layers are deposited whereby the plurality of target areas includes between the plurality of overlap splices, and between the plurality of overlap splices and a plurality of additional tows upon which the plurality of hoop tows is deposited.

6. The method according to claim 1, wherein the plurality of sliced layers are deposited whereby the plurality of sliced layers includes a plurality of additional tows that are oriented nonparallel to the plurality of hoop tows, each of the plurality of additional tows includes an unexposed area aligned with one or more of the plurality of overlap splices in the plurality of hoop tows, and the unexposed areas are outside of the plurality of target areas to permit shear in the plurality of additional tows when the composite component is draped on the curved tool.

7. The method according to claim 1, wherein the plurality of sliced layers are deposited whereby the plurality of hoop tows is deposited in a plurality of courses, and the plurality of overlap splices are offset from each other among the plurality of courses.

8. The method according to claim 1, wherein the plurality of sliced layers are deposited whereby the plurality of hoop tows is disposed on two or more of the plurality of sliced layers.

9. The method according to claim 1, wherein the plurality of sliced layers are deposited whereby the composite component is part of an aircraft.

10. The method according to claim 1, wherein the curved tool has a radius from the axis of curvature in a range of approximately 25 inches to approximately 114 inches.

11. A composite component formed by the method of claim 1.

12. A manufacturing system comprising:
   an automated-fiber-placement system configured to deposit plurality of sliced layers on a stationary form to create a composite component, wherein the plurality of sliced layers includes a plurality of hoop tows, one or more overlap splices are formed in each of the plurality of hoop tows, and the stationary form is approximately flat, and the automated-fiber-placement system is configured to apply a layup heat to a plurality of target areas on the plurality of sliced layers during the deposit and withhold the layup heat in a plurality of unexposed areas, wherein the plurality of target areas and the plurality of unexposed areas are spatially arranged to permit a slippage in the plurality of overlap splices;

a pick-and-place machine configured to drape the composite component on a curved tool with the plurality of hoop tows oriented perpendicular to an axis of curvature of the curved tool, wherein the plurality of overlap splices in the plurality of unexposed areas slip to conform the composite component to the curved tool; and an autoclave configured to apply a curing heat to the composite component after the composite component has been contoured by the curved tool, wherein the curing heat inhibits a further slippage in the plurality of overlap splices.

13. The manufacturing system according to claim 12, wherein the automated-fiber-placement system is further configured to deposit the plurality of sliced layers whereby each of the plurality of overlap splices includes a first segment overlaid with a second segment, the second segment is inside of the plurality of target areas, and the first segment is outside of the plurality of target areas to permit the slippage.

14. The manufacturing system according to claim 12, wherein the automated-fiber-placement system is further configured to deposit the plurality of sliced layers whereby each of the plurality of overlap splices includes a first segment overlaid with a second segment, and both the first segment and the second segment are outside of the plurality of target areas to permit the slippage.

15. The manufacturing system according to claim 12, wherein the automated-fiber-placement system is further configured to deposit the plurality of sliced layers whereby each of the plurality of overlap splices includes at least one unexposed area of the plurality of unexposed areas in which a first segment is overlaid with a second segment, and the unexposed area is outside of the plurality of target areas to permit the slippage.

16. The manufacturing system according to claim 12, wherein the automated-fiber-placement system is further configured to deposit the plurality of sliced layers whereby the plurality of target areas includes between the plurality of overlap splices, and between the plurality of overlap splices and a plurality of additional tows upon which the plurality of hoop tows is deposited.

17. The manufacturing system according to claim 12, wherein the automated-fiber-placement system is further configured to deposit the plurality of sliced layers whereby the plurality of sliced layers includes a plurality of additional tows that are oriented nonparallel to the plurality of hoop tows, each of the plurality of additional tows includes an unexposed area aligned with one or more of the plurality of overlap splices in the plurality of hoop tows, and the unexposed areas are outside of the plurality of target areas to permit shear in the plurality of additional tows when the composite component is draped on the curved tool.

18. The manufacturing system according to claim 12, wherein the automated-fiber-placement system is further configured to deposit the plurality of sliced layers whereby the plurality of hoop tows is deposited in a plurality of courses, and the plurality of overlap splices are offset from each other among the plurality of courses.

19. The manufacturing system according to claim 12, wherein the automated-fiber-placement system is further configured to deposit the plurality of sliced layers whereby the plurality of hoop tows is disposed on two or more of the plurality of sliced layers.

20. The manufacturing system according to claim 12, wherein the automated-fiber-placement system is further configured to deposit the plurality of sliced layers whereby the composite component is part of an aircraft.

\* \* \* \* \*

UNITED STATES PATENT AND TRADEMARK OFFICE
CERTIFICATE OF CORRECTION

| | |
|---|---|
| PATENT NO. | : 11,565,483 B2 |
| APPLICATION NO. | : 17/466258 |
| DATED | : January 31, 2023 |
| INVENTOR(S) | : James R. Kendall and Stephen J. Dostert |

It is certified that error appears in the above-identified patent and that said Letters Patent is hereby corrected as shown below:

In the Claims

Claim 12, Column 14, Line 66: "deposit plurality". Should read --deposit a plurality--

Signed and Sealed this
Eleventh Day of April, 2023

*Katherine Kelly Vidal*

Katherine Kelly Vidal
*Director of the United States Patent and Trademark Office*